US012622423B2

(12) United States Patent
Kavanaugh

(10) Patent No.: US 12,622,423 B2
(45) Date of Patent: May 12, 2026

(54) BEAD STORAGE SYSTEM

(71) Applicant: Clear Blue Waters. Inc., Eau Claire, WI (US)

(72) Inventor: Patrick J. Kavanaugh, Eau Claire, WI (US)

(73) Assignee: Clear Blue Waters, Inc., Eau Claire, WI (US)

( * ) Notice: Subject to any disclaimer, the term of this patent is extended or adjusted under 35 U.S.C. 154(b) by 577 days.

(21) Appl. No.: 18/053,547

(22) Filed: Nov. 8, 2022

(65) Prior Publication Data

US 2023/0148581 A1 May 18, 2023

Related U.S. Application Data

(60) Provisional application No. 63/263,895, filed on Nov. 11, 2021.

(51) Int. Cl.
B25B 27/00 (2006.01)
A01K 97/06 (2006.01)
B25B 27/14 (2006.01)

(52) U.S. Cl.
CPC .............. A01K 97/06 (2013.01); B25B 27/14 (2013.01)

(58) Field of Classification Search
CPC ............ B25B 27/00; B25B 27/14; B25B 5/00
See application file for complete search history.

(56) References Cited

U.S. PATENT DOCUMENTS

| | | | | | |
|---|---|---|---|---|---|
| 5,280,659 | A | * | 1/1994 | Park | B25F 1/003 |
| | | | | | 7/128 |
| 5,794,496 | A | * | 8/1998 | Arnold | B25B 13/463 |
| | | | | | 81/177.8 |
| 5,802,936 | A | * | 9/1998 | Liu | B25G 1/085 |
| | | | | | 81/177.4 |
| 5,931,063 | A | * | 8/1999 | Kuo | B25B 13/08 |
| | | | | | 81/186 |
| 6,050,165 | A | * | 4/2000 | Hall | B25B 13/461 |
| | | | | | 81/59.1 |
| 8,857,296 | B2 | * | 10/2014 | Huang | B22D 17/24 |
| | | | | | 81/63 |
| 2008/0271256 | A1 | * | 11/2008 | Frazer | B25F 1/003 |
| | | | | | 7/128 |
| 2014/0068870 | A1 | * | 3/2014 | Runnels | B25F 1/00 |
| | | | | | 7/169 |

* cited by examiner

*Primary Examiner* — Lee D Wilson
(74) *Attorney, Agent, or Firm* — Jonas R. Mellang; Kelly, Holt & Christenson, P.L.L.C

(57) ABSTRACT

Embodiments of a bead storage system are disclosed herein. In one example, the system includes a bead holder having at least one bead. The system also includes a lever holder having at least two levers that are configured to be simultaneously pressed so as to squeeze the bead when the bead holder is stacked together with the lever holder.

20 Claims, 6 Drawing Sheets

BEAD STORAGE SYSTEM

CROSS-REFERENCE TO RELATED APPLICATION

The present application is based on and claims the benefit of U.S. provisional patent application Ser. No. 63/263,895, filed Nov. 11, 2021, the content of which is hereby incorporated by reference in its entirety.

CROSS-REFERENCE TO RELATED APPLICATION

The present application incorporates by reference U.S. application Ser. No. 12/876,386 filed Sep. 7, 2010.

BACKGROUND

A bead typically has an inner hollow chamber. Then, at least two openings are formed in the bead so as to provide access to the inner hollow chamber. Thus, the bead essentially has a hole running through it, usually straight through it along a central axis of the bead. The end of a string may be pushed or threaded through one of the two openings in the bead, through the inner chamber and out the other (or another) opening. Thus, the bead becomes secured on the string, though in most cases it is allowed to slip up and down the string.

A bead of the described design is therefore secured on the string by pushing the string through one bead hole and out the other. In order to be able to feed the bead onto the string, the strong must have at least one free end. It generally also must have at least a stretch of string near the end that is free of knots or similar restrictions that would prevent the bead from being fed onto the string. In other words, if a knot or some other obstruction is prohibiting access to a length of the string, the bead will not be able to be pushed onto that length of string. Otherwise, there may be no other choice but to cut the string so as to remove the obstruction and therefore free an end of the string to be fed through bead. It is also worth mentioning that a typical bead will have its holes be formed to have a diameter that is ideally larger than the diameter of the string so that the string is more easily pushed through the bead.

There are situations in which a user may wish to add a bead onto a length of string that has no unobstructed end available to feed through the bead. Or perhaps the user simply wants to add a bead to the string without having to thread a string through the bead. Or, perhaps the user wishes to add a bead between two existing beads that are already on the string, without having to first remove either of the existing beads.

One can imagine a scenario, for example, wherein a user may wish to add a new bead onto a string into the middle of a string of many beads that have already bead threaded onto the string. It would be most efficient to add this new bead to the string without removing any of the beads that are already threaded on the string. The bead to be added may, for example, be of a different color so as to nicely compliment the beads already present on the string. If one were forced to remove half the beads already on the string to accommodate the addition of the new bead, one would have to re-thread all of the removed beads one-by-one until the complete design is reconstructed.

Up until now, the described dilemma has been described in the context of adding beads to a string perhaps for decorative purposes. But the same dilemma does raise its head in other contexts. Fishing tackle is a great example. When a fishing rod is fully rigged, for example, access to the line generally obstructed on one end by the hook (or other fish engaging tackle) and on the other end by connection to the reel. Thus, threading tackle onto the line (like threading a bead onto a string) generally requires that at least one end of the line be free of obstruction. In many cases, the hook must be cut off in order to at least temporarily free an end of the line to be threaded through a bead-like item of tackle. Of course, the hook can be reattached. But it would still be more desirable to attach tackle onto a line without having to have a free end.

Devices have been described in an attempt to allow for quick attachment to a string. For example, U.S. Pat. No. 6,931,786 describes a fisherman sinker-bobber; U.S. Pat. No. 5,203,107 describes a fishing line limit assembly; and U.S. Pat. No. 5,377,443 describes glass fishing weights. Although these devices may generally be attached to a string or line without threading through a hole, the disadvantages of these devices and the advantages of the present invention should become apparent to those skilled in the art from a review of the description.

SUMMARY

Embodiments of a bead storage system are disclosed herein. In one example, the system includes a bead holder having at least one bead. The system also includes a lever holder having at least two levers that are configured to be simultaneously pressed so as to squeeze the bead when the bead holder is stacked together with the lever holder.

DETAILED DESCRIPTION

Figure 1:
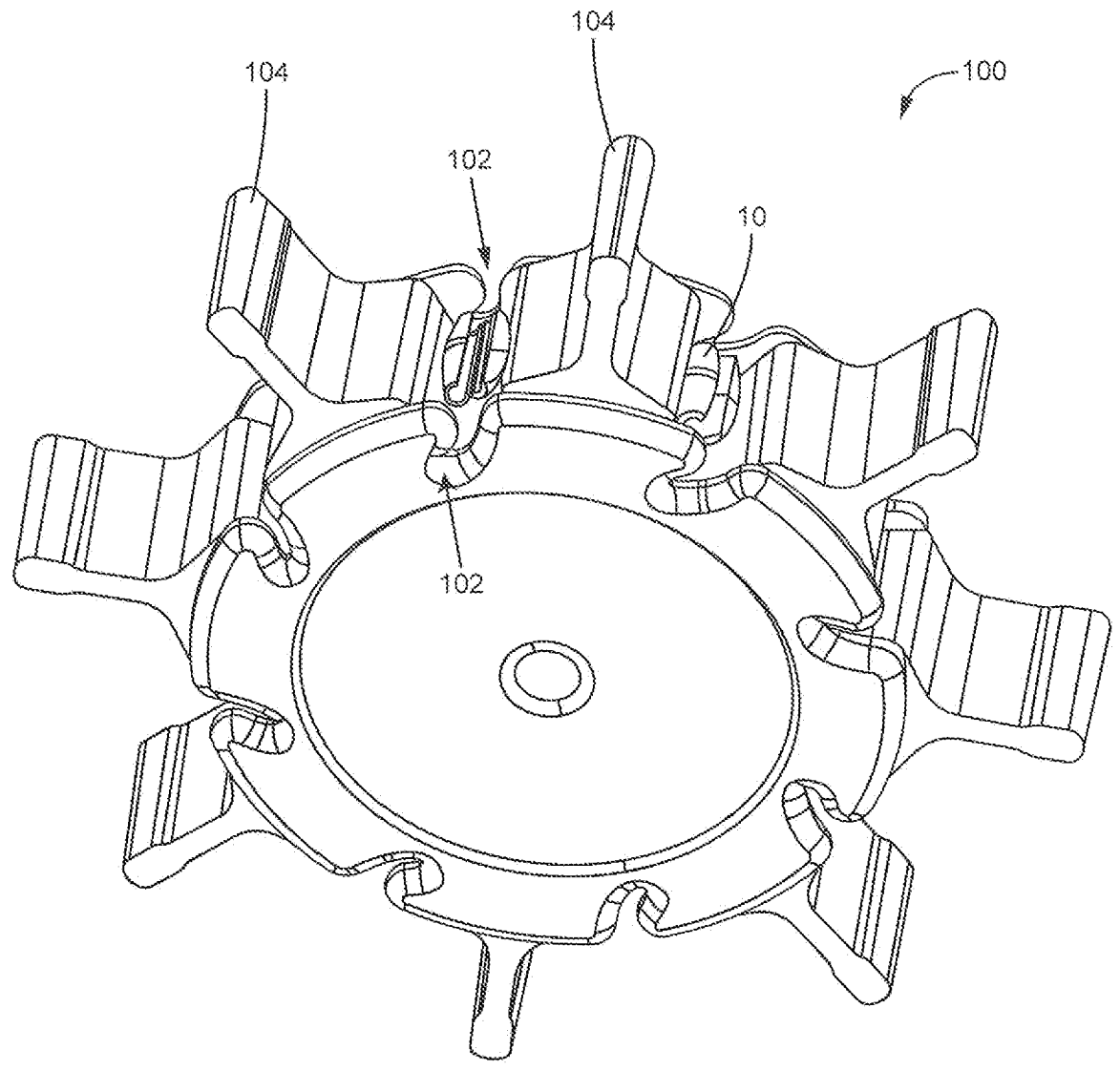
FIG. 1 is a bottom perspective view showing an example bead storage system.

FIG. 1 is a bottom perspective view showing an example bead storage system 100. Bead storage system 100 includes a plurality of beads 10. These beads 10 can be similar to beads 10 in U.S. application Ser. No. 12/876,386 filed Sep. 7, 2010 which is herein incorporated by reference. In some examples, beads 10 are used on fishing lines as bobber stops. As noted in the previous application, beads 10 are compressed to be locked onto the fishing line, string or other line. As shown, bead storage system 100 includes levers 104. Levers 104 can be used to compress beads 10 onto the line. Levers 104 provide additional leverage to compress beads 10, as compared to trying to squeeze the bead with your fingers. Of course, a bead 10 could be squeezed with an external device such as a pair of plyers, but the levers 104 provide built-in convenience. Bead storage system 100 also includes guides 102 that facilitating a guiding of the line into bead 10 before it is compressed.

Beads 10 are coupled to a central holder (not shown in FIG. 1). Once a bead 10 is pinched/coupled to a line, the line can illustratively be pulled so as to free the bead 10 from its connection to the holder. In some examples, the compressing of bead 10 is configured to automatically in and of itself free the bead from the holder (i.e., rather than requiring the line to be pulled to break the connection).

Figure 2:
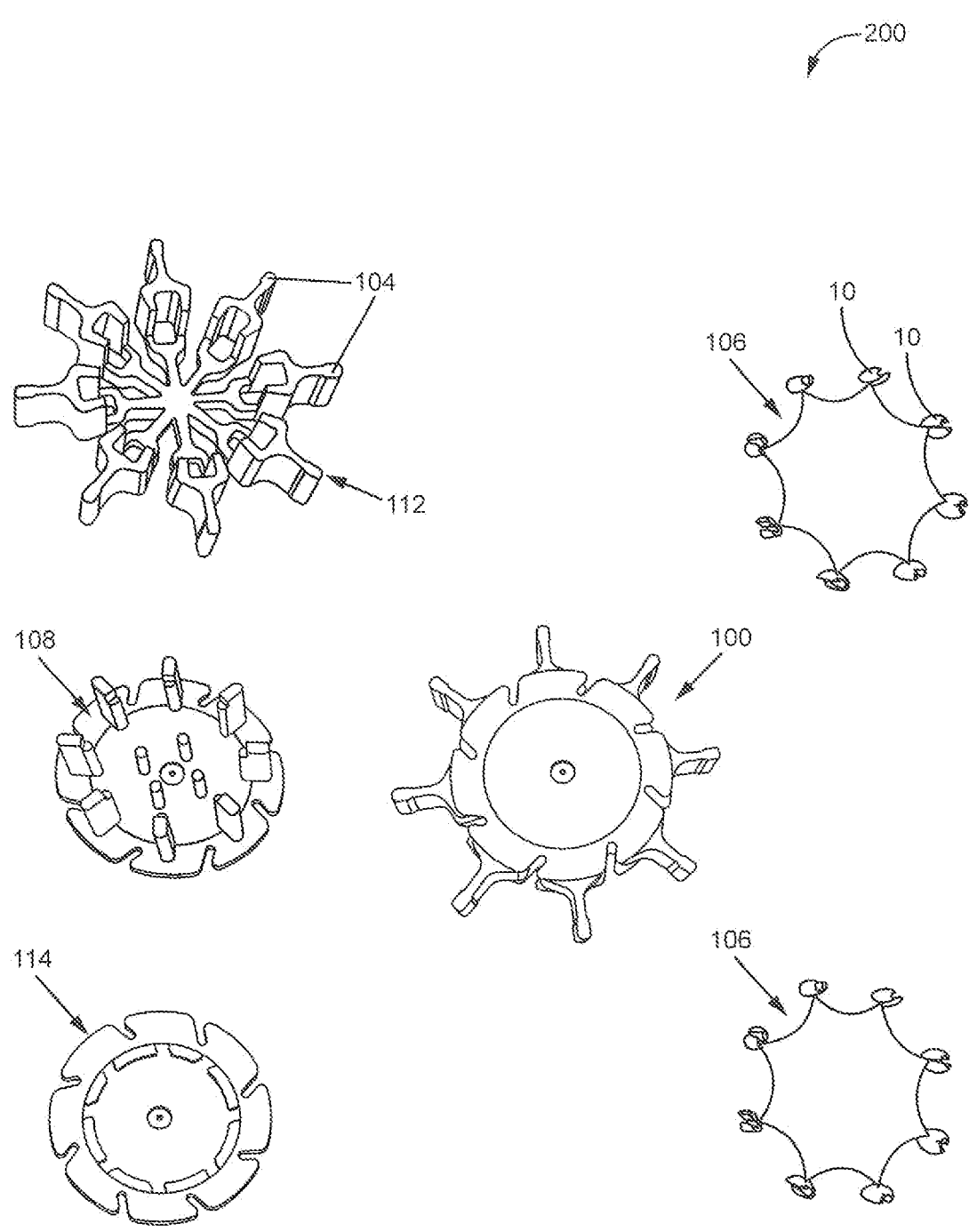
FIG. 2 is a perspective view showing various components of an example bead storage system.

FIG. 2 is a perspective view showing various components of an example bead storage system 200. System 200 includes plate 108, plate 114, lever holder 112, and bead holders 106. Plates 108 and 114 are illustratively configured to couple together. Lever holder 112 is illustratively configured to set between plates 108 and 114, when plates 108 and 114 are coupled together. A bead holder 106 is illustratively configured to rest inside of a lever holder 112. Thus, a bead holder is illustratively placed into a lever holder 112, and then this combination is settled between plates 108 and 114. Plates 108 and 114 are shown in FIG. 2 as being at least semi-transparent, which allows a user to see which beads 10 on bead holder 106 are still available to be attached to a line. In other examples, plate 108 and/or plate 114 are different colors and/or opacities.

In the shown example, components 108, 114, and 104 are generally re-useable, and then bead holder 106 is disposable (after all beads 10 are expended). In other examples, bead holder 106 is re-useable. In some examples, bead holder 106 is not needed and beads 10 are inserted into the assembly without holder 106. All combination are conceived and possible.

Figure 3:
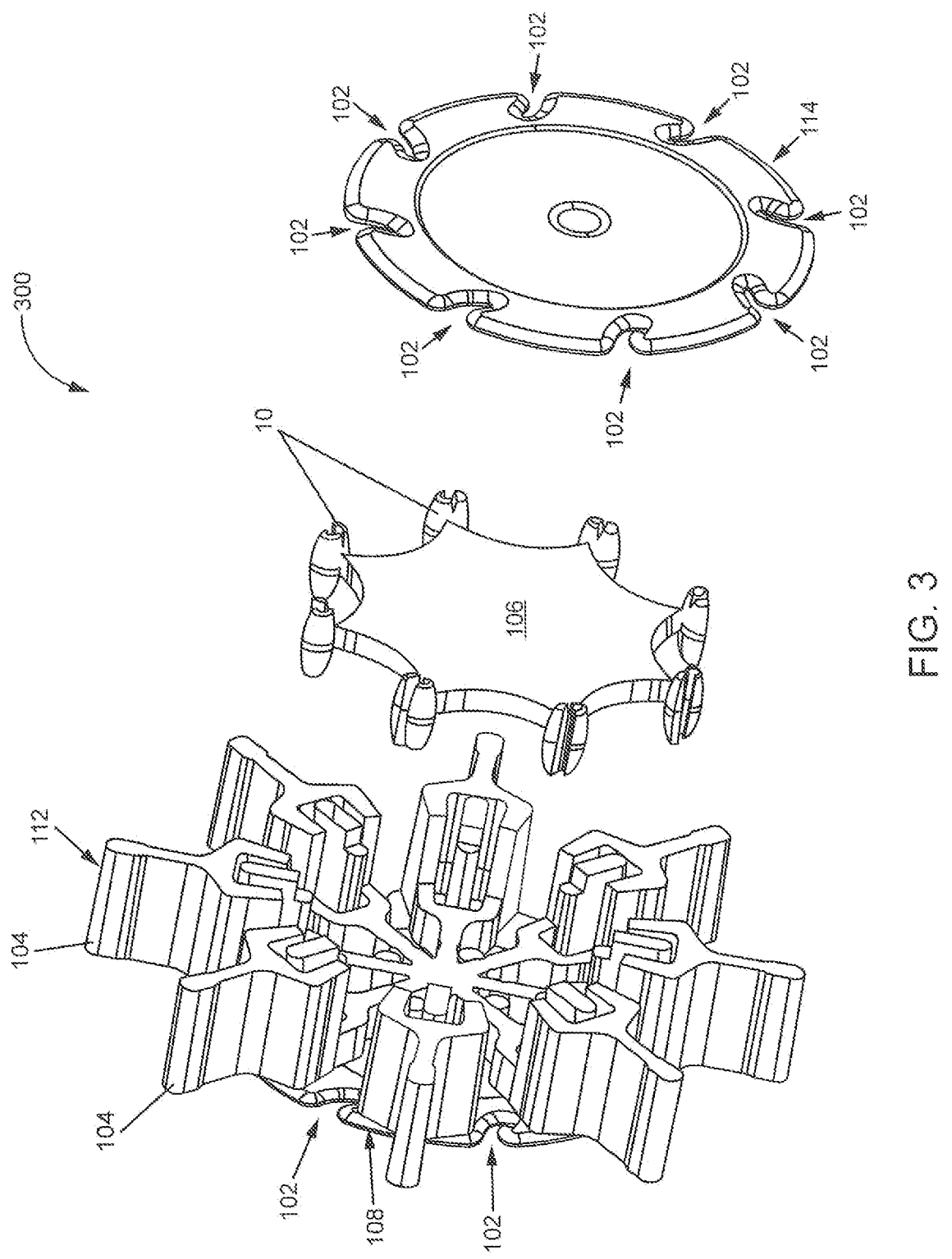
FIG. 3 is an exploded view showing an example bead storage system.

FIG. 3 is an exploded view showing an example bead storage system 300. As shown, lever holder 112 is coupled to plate 108. Bead holder 106 and plate 114 are aligned with this assembly.

Figure 4:
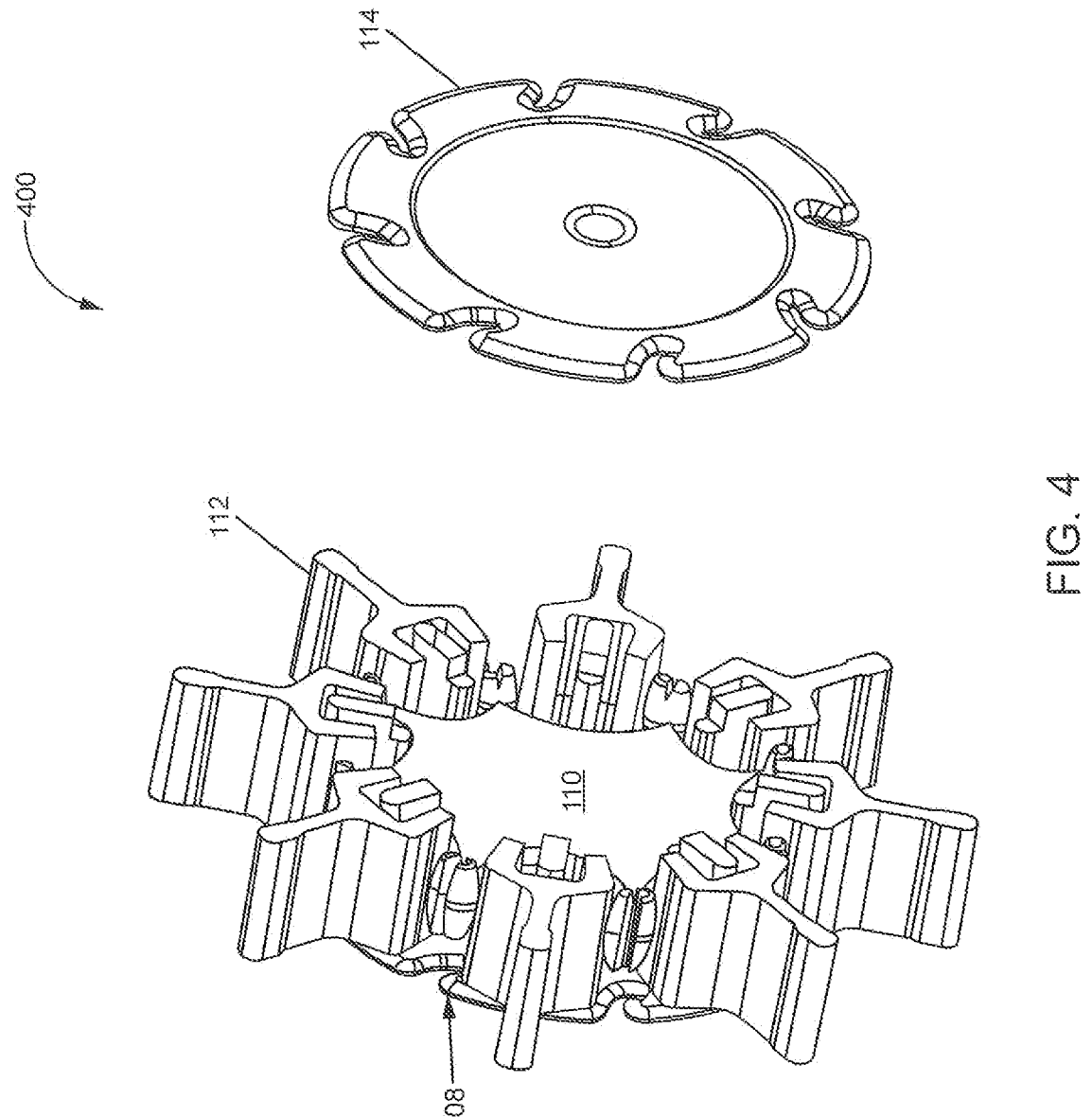
FIG. 4 is an exploded view showing an example bead storage system.

FIG. 4 is an exploded view showing an example bead storage system 400. As shown, lever holder 112 is coupled to plate 108. Bead holder 110 has been disposed within the assembly. Plate 114 is aligned with the assembly and can be coupled to the assembly to retain bead holder 110.

Figure 5:
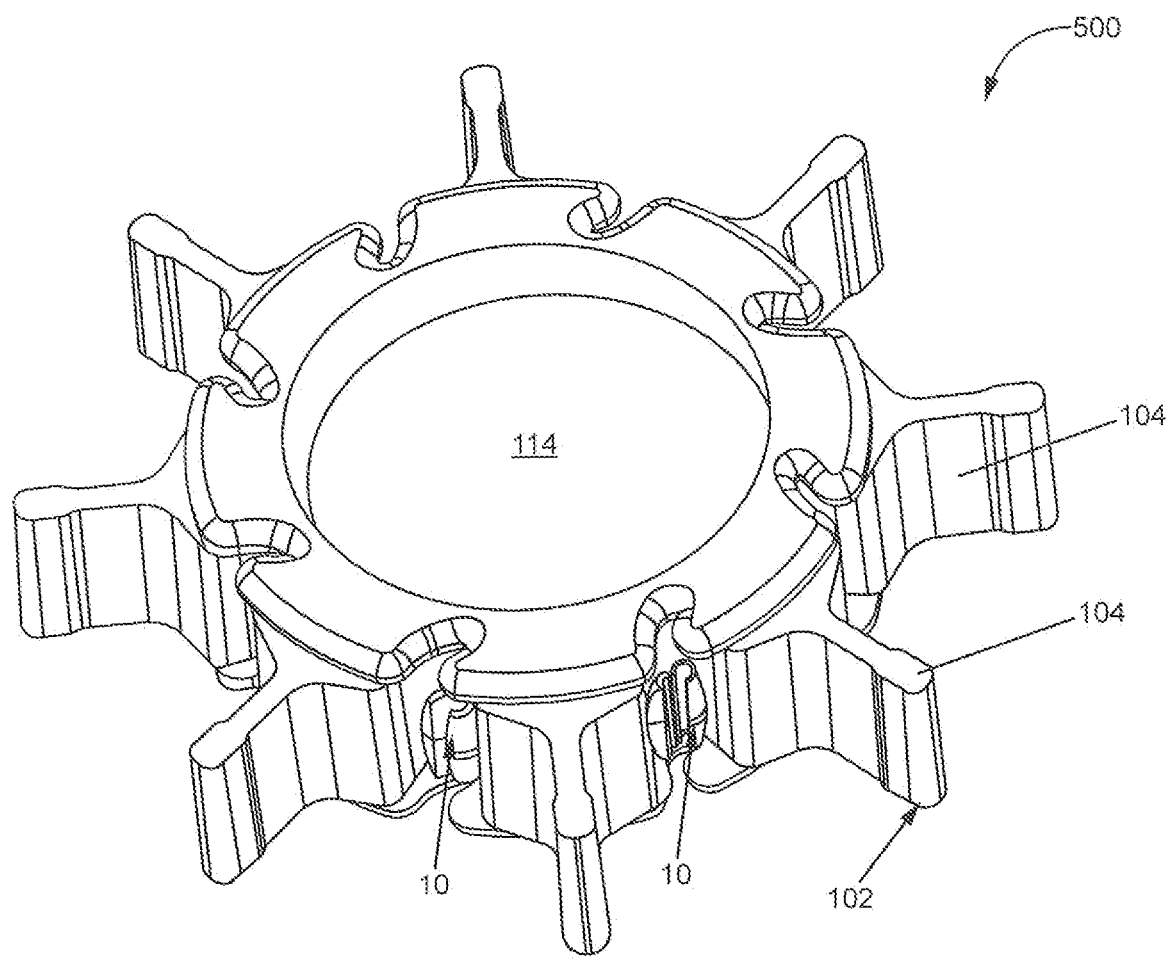
FIG. 5 is a perspective view showing an example bead storage system.

FIG. 5 is a perspective view showing an example bead storage system 500. As shown, all components are plastic, however, in other examples, the components can include other materials as well. For example, as shown lever holder 112 is a deformable plastic that allows the levers 104 to compress beads 10. In another example, lever holder 112 could be metal and the levers 104 are coupled to 102 one or more joints that allow the levers 104 to pivot.

Figure 6:
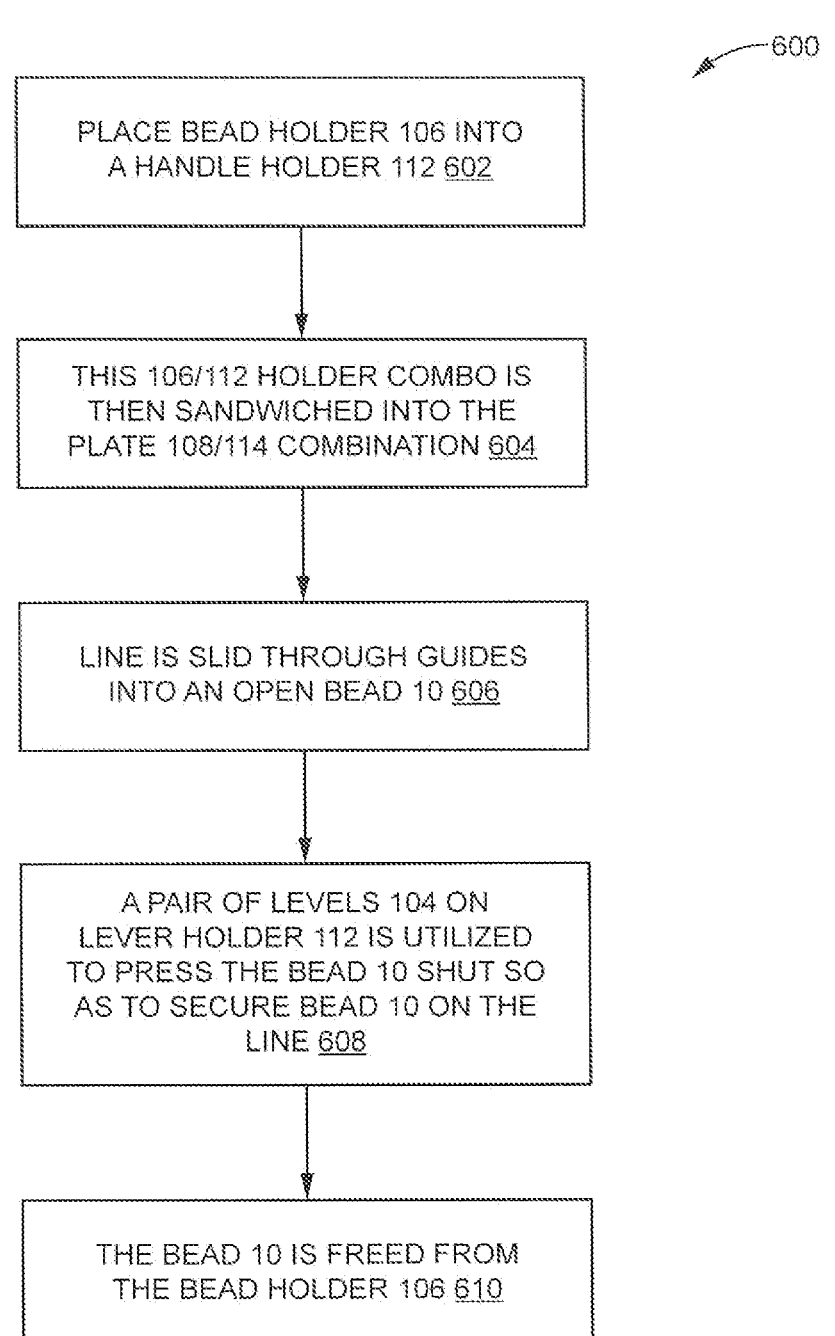
FIG. 6 is a flow chart diagram demonstrating a series of steps involved in a method for utilizing a bead storage system to attach a bead to a line.

FIG. 6 is a flow chart diagram demonstrating a series of steps involved in a method 600 for utilizing a bead storage system, embodiments of which are described herein, to attach a bead, for example, a bead 10, to a line. In accordance with step 602, a bead holder 106 with its associated beads 10 is placed into a lever holder 1112. In accordance with block 604, this 106/112 combination of components is then sandwiched between the combination of plate 108 and plate 114. Thus, the guides 102 then define a path for a length of line to be slid through the guides 102 and into a bead 10. In accordance with block 606, the line is thus slid through the guides into an open (i.e., similar to an open clam shell configuration) bead 10. In accordance with block 608, a pair of levers 104 is on the lever holder 112 is then utilized to press the bead 10 shut so as to secure the bead 10 to the line. In accordance with block 610, the bead 10 is then pulled (or mechanically released, in one embodiment, for example by a protruding tab that is configured to push on the bead when the levers 114 are squeezed together) free of the bead holder 106. And thus, the bead 10 is transferred from the bead holder 106 onto the line without having to thread an end of the line through the bead 10.

Although the present invention has been described with reference to preferred embodiments, workers skilled in the art will recognize that changes may be made in form and detail without departing from the spirit and scope of the invention.

What is claimed is:

1. A bead storage system, comprising:
   a frame that includes a lever that deforms to compress a bead so as to attach the bead onto a fishing line; and
   a plate coupled to the frame and having a guide slot formed therein, the guide slot provides a path for guiding the fishing line into the bead.

2. The bead storage system of claim 1, and further comprising:
   two levers included in the frame, wherein the lever is one lever of the two levers included in the frame, and wherein the two levers deform to compress the bead so as to attach the bead onto the fishing line.

3. The bead storage system of claim 2, wherein the plate and the frame are separate pieces that stack together such that, when the plate and the frame are stacked together, the guide slot provides a path for guiding the fishing line between the two levers.

4. The bead storage system of claim 3, wherein the bead can be in an open position or a closed position, and wherein, when the plate and the frame are stacked together, the guide slot provides a path for the fishing line to be inserted between the two levers and into the bead while the bead is in the open position.

5. The bead storage system of claim 2, wherein the frame is a singly formed component that includes the two levers and at least two additional levers formed therein.

6. The bead storage system of claim 1, and further comprising:
   a bead holder that stacks together with the frame and the plate, wherein the bead bolder detachable connects to the bead such that the bead, which is detachably connected to the bead holder, is next to the lever when the bead holder, the frame, and the plate are stacked together, and wherein, while the bead holder is stacked together with the frame and the plate, the lever deforms to compress the bead.

7. The bead storage system of claim 6, wherein the bead holder includes a plurality of beads detachably connected thereto, and wherein the bead is one of the plurality of beads.

8. The bead storage system of claim 7, wherein the bead holder is a singly formed component, and wherein the plurality of beads connected to the bead holder includes at least 4 beads.

9. A bead storage system comprising:
   a bead holder that includes a bead detachably connected thereto; and
   a frame connected to the bead holder, the frame having at least two levers, wherein the two levers are configured to deform when simultaneously pressed to squeeze the bead so as to attach the bead to a fishing line.

10. The bead storage system of claim 9, and further comprising:
   a plate having a guide slot formed therein, wherein the plate is separate from the bead holder and the frame, and wherein the plate is configured to stack together with the bead holder and the frame such that the guide slot defines a path for an insertion of the fishing line between the two levers and into a channel of the bead.

11. The bead storage system of claim 10, wherein the plate is at least partially transparent.

12. The bead storage system of claim 10, wherein the plate is one of two plates, and wherein the two plates are configured to stack together with the bead holder and the frame.

13. The bead storage system of claim 12, wherein the two plates, the frame, and the bead holder are separate pieces.

14. The bead storage system of claim 9, wherein the bead holder and the frame are configured to stack together such that the bead rests between the two levers.

15. The bead storage system of claim 9, wherein the bead is one of a plurality of beads detachably connected to the bead holder, and wherein each lever, of the two levers, is configured to apply pressure to at least two different beads, of the plurality of beads.

16. A bead storage system, comprising:
 a frame that includes two levers that are pressed together so as to apply pressure to a bead that is positioned between the two levers; and
 a bead holder that includes the bead detachably connected thereto, wherein the bead holder is configured to stack with the frame such that the bead is positioned between the two levers when the bead holder is stacked with the frame.

17. The bead storage system of claim 16, wherein the frame further comprises at least two other levers in addition to the two levers.

18. The bead storage system of claim 17, wherein the bead holder includes a second bead detachably connected thereto, and wherein the bead holder is configured to stack with the frame such that the second bead is positioned between the at least two other levers when the bead holder is stacked with the frame.

19. The bead storage system of claim 16, wherein the frame further comprises at least four other levers in addition to the two levers.

20. The bead storage system of claim 16, and further comprising:
 a plate having a guide slot formed therein, wherein the plate is configured to be stacked with the frame such that the guide slot is positioned between the two levers.

* * * * *